Dec. 15, 1953  H. O. McMAHON  2,662,520
PRESERVATION AND STORAGE OF BIOLOGICAL MATERIALS
Filed Feb. 6, 1951
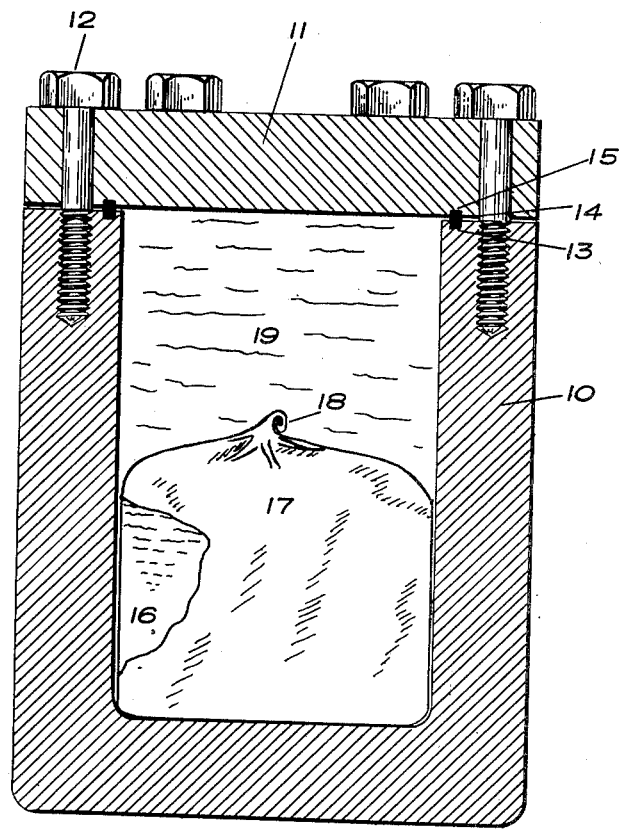
INVENTOR
HOWARD O. MCMAHON
BY
AGENT

UNITED STATES PATENT OFFICE 2,662,520

PRESERVATION AND STORAGE OF BIOLOGICAL MATERIALS

Howard O. McMahon, Lexington, Mass., assignor to Arthur D. Little, Inc., Cambridge, Mass., a corporation of Massachusetts Application February 6, 1951, Serial No. 209,547

13 Claims. (Cl. 128—1)

This invention relates to the preservation and storage of biological materials for long periods of time.

Biological materials which are composed to a considerable extent of cellular components containing aqueous fluid are frequently difficult to preserve and store for any substantial length of time. The deterioration and other detrimental reactions which occur quite rapidly in these materials at ordinary room temperatures can be greatly slowed down as the storage temperature is decreased toward the freezing point. Even then, however, deterioration is frequently rapid enough to require the utmost dispatch in getting the biological material from its source to the point of use before deterioration sets in. If these materials could be held at still lower temperatures, for example, $-10°$ to $-20°$ C., or even lower, their useful life, and hence their utility, would be significantly increased. But a decrease in temperature to and below the freezing point cannot as a rule be tolerated, because of damage to these biological materials by the step of freezing, and their consequent uselessness for their intended purposes. This damage is due to a number of causes, some of them not fully understood. In the case of biological materials having a cellular structure, the damage appears to be caused at least in part by growth of ice crystals which initially form within the cells and then grow until they puncture the cell membranes and other structures. Damage in some instances appears to be due to a denaturation of the protein content, due probably to extraction or removal of some water from the protein molecules in the step of forming ice. But whatever the reason or reasons, the damage which occurs when a biological material is cooled to below its freezing point is caused by the phase change from water to ice.

It is accordingly a principal object of this invention to provide a procedure for preserving and storing biological materials at a temperature below the freezing point of their liquid components and yet without damage to their structure and without impairment of their utility. Another object is to effect such preservation and storage for long periods of time—e. g. several months. Other objects will appear from the following disclosure:

Among the materials amenable to treatment in accordance with this invention are various non-living biological materials such as vaccines, sera, enzymes, and hormones, and various living biological materials such as molds, bacteria, and tissues e. g. for transplanting. Thus, several of the more common vaccines are unstable on prolonged storage and must be prepared fresh at frequent intervals; it would therefore be of considerable advantage to the armed services, for example, to be able to transport such vaccines over long distances and to store and preserve them for long periods of time. Similarly, healthy living tissue, such as human cornea, which is used to restore defective parts by surgery, cannot be kept for any appreciable length of time without spoilage; consequently the matter of coordinating a donor and a recipient is frequently a very considerable task. This invention may therefore present a convenient solution to much of this sort of preservation problem.

It is known that water and aqueous solutions expand considerably upon freezing and because of this, the application of pressure causes the freezing temperature to be reduced.

The procedure of this invention may be carried out by placing the biological material under sufficient pressure, in any device suitable for the purpose, and then lowering the temperature to the desired point. Pressures up to 2000 atmospheres (30,000 p. s. i.), and temperatures down to $-20°$ C., may be thus employed. Even higher pressures may be used, but are not necessary for temperatures no lower than $-20°$ C. For storage at temperatures above $-20°$ C. and below $0°$ C., the pressure may, if desired, be less than 2000 atmospheres but nevertheless must always be sufficient to prevent formation of ice crystals at the temperature selected. The requisite pressure is always applied before the desired temperature is actually reached. In order to bring the stored biological material into use, the temperature must be raised sufficiently in advance of any lowering of the pressure that no ice crystals are formed. This is because removal of the pressure first would cause ice crystal formation before the temperature was raised to above the normal melting point. The biological may be warmed to above $0°$ C. before releasing the pressure at all, or the pressure may be removed gradually during warming—but being always kept sufficiently high to prevent freezing of the biological material.

As a variant of the foregoing method, the biological material to be preserved, while still at a temperature above $0°$ C., may first be put under a pressure in excess of 2000 atmospheres and then subjected to a temperature down to $-20°$ C. or even lower. At temperatures below $-20°$ C., and depending upon the pressure and the nature of the biological material, a non-expanding allotropic modification of ice (ice II) will form in the biological material. This form of ice however does not have the objectionable expansion properties of the normal allotropic form of ice (ice I), and therefore when it forms it does not tend to disrupt by expansion action the cells of the biological material. Hence this procedure may be employed in certain instances when storage at temperatures below $-20°$ C. is desired, and when the biological material is not denatured or otherwise injured by the formation of the non-expanding allotropic form of ice. It should be pointed out here that in this variant of the first-described procedure, the temperature of the biological material should be raised to above the normal melting point before the pressure is decreased below at least 2000 atmospheres—otherwise, ice I will suddenly form with probable considerable damage to the material.

While various types of conventional apparatus may be used in carrying out the objects of this invention, the type shown in the accompanying drawing is especially useful for carrying out the first-mentioned procedure because of its simplicity of construction and its essentially automatic method of operation. In the drawing, there is shown a heavy-walled pressure chamber 10, preferably cylindrical, having a heavy-walled cover 11 which can be fastened to chamber 10 by bolts 12. Gasket 13 is provided fitting into grooves 14 and 15 in chamber and cover respectively, so that when the cover is bolted down tightly the space within the chamber is effectively sealed against ingress or egress of liquids or vapors.

The biological material 16 to be preserved is placed in a liquid-tight plastic bag 17 which is sealed at its mouth 18. This bag is then placed within chamber 10, as shown, and water 19 is added to fill the chamber level-full. The cover 11 is then bolted down tightly, and the assembly is then subjected to freezing conditions.

The water 19 accordingly begins to turn to ice, expanding as it does so. Since the water in the biological material 16 is actually in the form of an aqueous solution, it does not freeze at the same temperature as that of water (at any given pressure)—its freezing point is always somewhat lower than that of the water 19 at any given pressure. The water 19 freezes in an amount sufficient to pressurize the chamber to a pressure consistent with the temperature, and finally, at $-20°$ C. this pressure has risen to 2000 atmospheres without freezing the biological material 16.

It is obvious that chamber 10 and cover 11 must be made strong enough to resist any appreciable change in shape or size when the water 19 therein freezes. Furthermore, care should be taken to insure that there are no pockets of gas or air either within or around the bag 17 or elsewhere within the chamber 10 when it is filled and closed. The exact shape and positioning of the bag within the container is not material—for example it could be suspended from the cover and be surrounded with water on all sides—hence fundamentally there is provided a body of biological material, a body of water, and a flexible waterproof barrier or partition between the two, all of which together completely fill the space within the closed container 10.

I claim:

1. Method of preserving and storing a biological material, which comprises applying to said material a superatmospheric pressure, and cooling said material, while under pressure, to a point below the normal freezing point thereof at atmospheric pressure, and maintaining said material, during the cooling step and thereafter while it remains at a temperature below said freezing point, under sufficient pressure to prevent the formation of ice I.

2. Method of treating a biological material which comprises applying to said material a superatmospheric pressure, cooling said material while under pressure to a temperature below its normal freezing point at atmospheric pressure but not below $-20°$ C., maintaining said material, while cooling and when cooled, at a pressure sufficient to prevent the formation of ice I but insufficient to cause formation of ice II, and thereafter raising the temperature of said material to above its said normal freezing point and then removing the superatmospheric pressure on said material.

3. Method of preserving and storing a biological material which comprises subjecting said material to a pressure of about 2000 atmospheres, then cooling it to a temperature of not less than $-20°$ C., and thereafter maintaining it at said temperature and pressure for a desired period of time.

4. In the method according to claim 3, the steps recited therein followed by the steps of first raising the temperature of said biological material to above 0° C. followed by the step of reducing the pressure on said material to atmospheric pressure.

5. Method of preserving and storing a biological material, which comprises placing said material and water in a closed container of fixed capacity, said material and said water being maintained in out-of-contact relation with each other and together filling said container to the exclusion of air or other gas, and then lowering the temperature of said container and its contents to a point below the normal freezing point of said contents but not lower than $-20°$ C.

6. Method of preserving and storing a biological material, which comprises placing said material in a flexible water-tight envelope, placing said envelope in a rigid closed container of fixed capacity together with enough water to fill completely the space within said container not occupied by said material and said envelope, and then lowering the temperature of said container and its contents to a temperature between 0° C. and $-20°$ C.

7. Method of treating a biological material which comprises applying to said material a superatmospheric pressure in excess of 2000 atmospheres, cooling said material, while maintaining said pressure, to a temperature below its normal freezing point at atmospheric pressure, and maintaining said cooled material under said pressure for a desired period of time.

8. Method according to claim 7 wherein said temperature is above $-20°$ C.

9. Method according to claim 7 wherein said temperature is below $-20°$ C.

10. Method according to claim 7 wherein said temperature is sufficiently far below $-20°$ C. to effect the formation of ice II in said material.

11. Method of treating a biological material which comprises applying to said material a superatmospheric pressure in excess of 2000 atmospheres, cooling said material, while maintaining said pressure, to a temperature sufficiently below $-20°$ C. to effect the formation of ice II in said material, maintaining said material under said pressure and at said temperature for a desired length of time, and thereafter getting said material ready for use by first raising its temperature to a point above said freezing point and thereafter removing the said superatmospheric pressure on said material.

12. Method of preserving and storing a biological material, which comprises cooling said material, while under superatmospheric pressure, to a point below the normal freezing point thereof at atmospheric pressure, and maintaining the superatmospheric pressure upon said material, throughout the cooling step and thereafter while said material remains at a temperature below said freezing point, sufficient to prevent the formation of ice I.

13. Method of preserving and storing a biological material, which comprises cooling said material to a point which is below the normal freezing point thereof at atmospheric pressure, and maintaining said material while so cooling and when so cooled at a superatmospheric pressure sufficient to prevent the formation of ice I.

HOWARD O. McMAHON.

References Cited in the file of this patent
UNITED STATES PATENTS

| Number | Name | Date |
|---|---|---|
| 1,086,265 | Barrows | Feb. 3, 1914 |
| 1,826,781 | Hayes | Oct. 13, 1931 |
| 2,315,425 | Hill et al. | Mar. 30, 1943 |